United States Patent [19]

Kotauczek

[11] 3,881,788
[45] May 6, 1975

[54] ARRANGEMENT FOR LUBRICATING A BEARING

[75] Inventor: Fritz Kotauczek, Schanbach, Germany

[73] Assignee: Daimler-Benz Aktiengesellschaft, Stuttgart, Germany

[22] Filed: Feb. 6, 1974

[21] Appl. No.: 440,009

[30] Foreign Application Priority Data
Feb. 7, 1973  Germany............................ 2305834

[52] U.S. Cl.................................. 308/21; 308/106
[51] Int. Cl. ............................................ F16c 13/00
[58] Field of Search ............ 308/21, 106, 107, 108, 308/93, 122, 240, 5 R, 112, 240

[56] References Cited
UNITED STATES PATENTS
2,158,272  5/1939  Chilton ................................. 308/21
2,345,822  4/1944  Leake ................................ 308/21 X

*Primary Examiner*—Lloyd L. King
*Assistant Examiner*—Gene A. Church
*Attorney, Agent, or Firm*—Craig & Antonelli

[57] ABSTRACT

An installation for the lubricating of a bearing, especially for rocker arms of internal combustion engines of motor vehicles with a first oil supply groove extending in the circumferential direction and provided at the inner surface of a bearing sleeve, into which terminates a radial oil supply bore of a pin; a second oil supply groove is provided in the bearing sleeve which extends essentially in the same direction as the first oil supply groove and at a distance therefrom; the pin on which the bearing sleeve is rotatably supported, is provided with a recess which, in the starting position of the bearing sleeve, overlaps only one oil supply groove and which so connects the two oil supply grooves with each other upon a slight rotary movement of the bearing sleeve that the previously interrupted oil supply is lifted and the lubricating oil which is now under pressure, is conducted to lubricating oil places by way of the second oil supply groove.

19 Claims, 5 Drawing Figures

ARRANGEMENT FOR LUBRICATING A BEARING

The present invention relates to an arrangement for the lubrication of a bearing, preferably for rocker arms in motor vehicles with an oil supply groove provided at the inner surface of a bearing shell or sleeve and extending in the circumferential direction, in which terminates a radial oil supply bore of a pin.

In the known prior art constructions of this type, the bearing sleeve moves relative to the pin in such a manner that a continuous overlapping of the oil supply groove with the oil supply bore exists and thus lubricating oil is fed uninterruptedly to the provided lubricating places. The oil inlet area is variable by the displacement of the oil supply groove with respect to the oil supply bore in the pin and the feed quantity of the lubricating oil is regulatable thereby. Since tolerances between the small oil supply bore and the oil supply groove, which occur for manufacturing reasons, are not controlled and as a result thereof the quantity of sprayed-off or ejected oil as well as the duration of the oil ejection cannot be accurately determined, the present invention is concerned with the task to avoid the aforementioned shortcomings and to provide a lubricating oil installation in a simple manner in which the danger of over-oiling or oiling-up does not occur.

The underlying problems are solved according to the present invention in that the bearing shell or sleeve is provided with a second oil supply groove extending in the same direction as the first oil supply groove and at a distance therefrom and in that the fixedly arranged pin, on which the bearing sleeve is rotatably supported, is provided with a recess which, in the starting position of the bearing sleeve, overlaps only one oil supply groove and with a slight rotary movement of the bearing sleeve so connects with each other the two oil supply grooves that the previously interrupted oil flow is lifted and the lubricating oil which is under pressure, is fed to the lubricating oil places by way of the second oil supply groove.

In one advantageous embodiment according to the present invention, a spray-off bore extending through the bearing sleeve, may branch off from the second oil supply groove for the purpose of lubricating a rocker arm bearing support and the parts cooperating with the rocker arm, and in continuation to this spray-off bore a through-bore may be arranged in the rocker arm which terminates in proximity to a connecting place formed by a push rod and a rocker arm, and additionally, the oil supply groove may split up or subdivide downstream of the spray-off bore—as viewed in the feed direction—into two oil distributor grooves which so terminate at the side surfaces of the bearing shell or sleeve that the discharged lubricating oil reaches the connecting place formed by rocker arm and valve stem by way of the forward area of the rocker arm.

Furthermore, it is appropriate that both oil supply grooves extend in the cross center plane of the bearing sleeve, of which both the first as well as also the second oil supply groove extend over a circumferential area of about 120°, and in that each of the oil distributor grooves branching off from the second oil supply groove, extends at an acute angle, especially at an angle of about 45° to the cross center plane starting from the cross center plane of the bearing sleeve.

In order to establish a simple flow connection between the first and the second oil supply groove, the recess in the pin is constructed as dead-end bore.

In a further embodiment according to the present invention, the first oil supply groove may extend, starting from the cross center plane of the bearing shell or sleeve, at an acute angle, especially at an angle of about 5° with respect to the bearing sleeve, whereas the second oil supply groove which includes a short auxiliary section beginning with the spray-off bore and extending parallel to the bearing axis, which passes over into the main section, may extend with its main section—in relation to the first oil supply groove—offset and parallel or approximately parallel thereto, and additionally the oil distributor grooves branching off from the second oil supply bore may extend parallel to the bearing axis.

A further feature according to the present invention resides in that the spray-off bore is located adjacent to the first oil supply groove shortly ahead of the end—as viewed in the feed direction.

According to the present invention, the recess located in the pin may be constructed as control groove which extends parallel to the bearing axis and has such a location that in case of overlap the control groove extends from the first oil supply groove by way of the spray-off bore to the first section of the second oil supply groove.

Accordingly, it is an object of the present invention to provide an installation for the lubrication of a bearing which avoids by simple means the aforementioned shortcomings and drawbacks encountered in the prior art.

Another object of the present invention resides in a lubricating arrangement for a bearing in which the quantity as well as the duration of the sprayed-off oil can be accurately determined, thereby eliminating the danger of excessive oiling.

A further object of the present invention resides in an installation for lubricating a bearing which is simple in construction, utilizes relatively few parts and can be manufactured in a relatively simple and inexpensive manner.

A still further object of the present invention resides in a lubricating arrangement of the type described above which is highly effective in operation, yet poses no problem as regards manufacture and assembly.

These and other objects, features and advantages of the present invention will become apparent from the following description when taken in connection with the accompanying drawing which shows, for purposes of illustration only, two embodiments in accordance with the present invention, and wherein.

Figure 1:
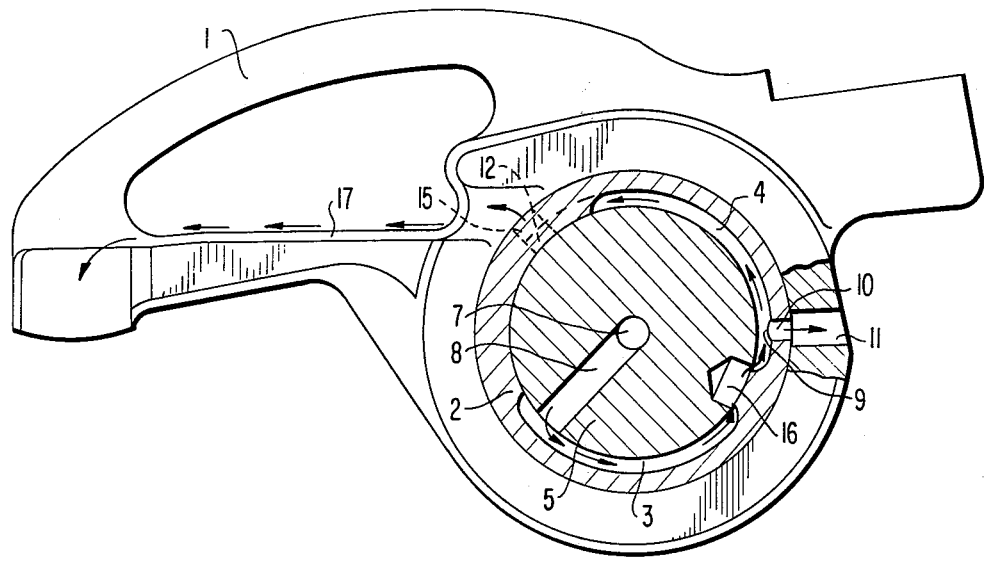
FIG. 1 is an elevational view, partly in cross section, of a bearing of a rocker arm in accordance with the present invention.

Referring now to the drawing wherein like reference numerals are used throughout the various views to designate like parts, and more particularly to FIG. 1, reference numeral 1 designates in this figure a rocker arm of a piston engine, into which is pressed-in a bearing shell or sleeve 2. The bearing sleeve 2 is provided at its inner surface with two oil supply grooves 3 and 4 which extend both in the cross center plane of the bearing sleeve 2.

Figure 5:
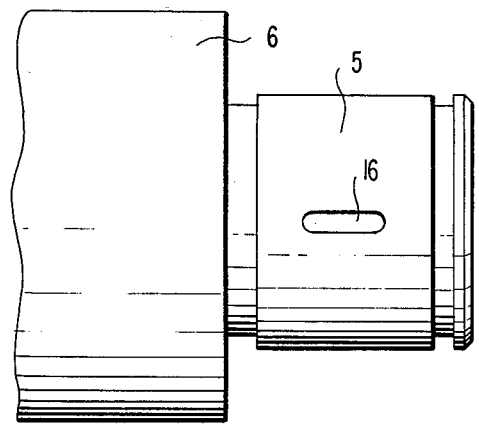
FIG. 5 is a bearing support with the pin provided with a control groove according to the present invention.

The rocker arm 1 is rotatably supported on a pin 5 of a bearing support or bracket 6 (FIG. 5) by way of the bearing sleeve 2. The pin 5 is provided with a central oil bore 7 (FIG. 1) and with an oil bore 8 branching off radially from the oil bore 7, of which the oil bore 8 terminates in the oil supply groove 3 of the bearing sleeve 2. The oil supply groove 3 which begins shortly upstream of the discharge of the radial bore 8—as viewed in the feed direction—extends over a circumferential area of about 120°, which is also the case of the second oil supply groove 4 adjoining the same with a slight spacing.

A spray-off bore 10 starting from the oil supply groove 4 leads through the bearing sleeve 2 at a place 9 to a through-bore 11 arranged in the rocker arm 1.

Figure 2:
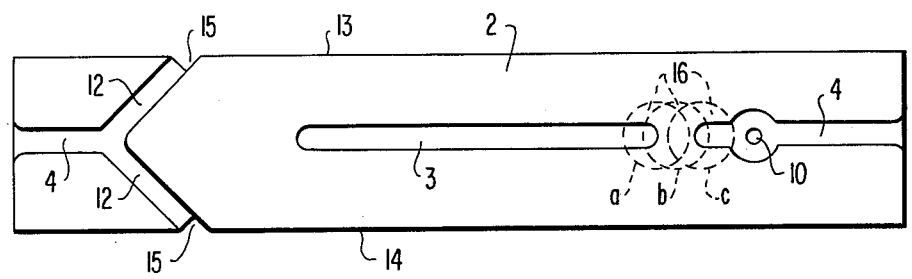
FIG. 2 is a development of the bearing shell or sleeve according to the present invention in the plane of the drawing.

The oil supply groove 4 splits off at the end into two distributor grooves 12—as can be seen from FIG. 2—which, starting from the cross center plane of the bearing sleeve 2, extend at an acute angle of about 45° with respect thereto and terminate at the side surfaces 13 and 14 at a place 15.

A recess 16 constructed as a dead-end bore is provided in the bearing pin 5, which is so located between the two oil supply grooves 3 and 4 in the center position of the rocker arm 1 illustrated in FIG. 1 that it partially overlaps both the first as also the second oil supply groove. This position of the rocker arm 1 relative to the bearing pin 5 enables a spraying off of the lubricating oil which initially is conducted by way of the central oil bore 7 and the radial oil bore 8 into the first oil supply groove 3 and by way of the dead end bore 16 in the bearing pin 5 into the second oil supply groove 4 and from there into the spray-off bore 10 and through-bore 11 and simultaneously into the distributor grooves 12, from where it sprays in one case the connecting place (not shown) formed by the rocker arm and a push rod and in the second case supplies with oil the place to be lubricated which is located between the valve stem head and the rocker arm. The oil discharged out of the distributor grooves 12 flows by way of discharge grooves 17, which are arranged on both sides at the rocker arm 1, up to the lubricating place.

If the rocker arm 1 rotates by a slight amount with respect to the fixedly supported pin 5, then by reason of the non-overlap between the oil groove 3 or 4 and the dead-end bore 16, the oil supply or the oil flow is interrupted. During this operation, an oil pressure builds up in the oil supply groove 3 which brings about that upon overlap (center position), the lubricating oil which previously was under a pressure, is sprayed off out of the discharge openings.

Two oil discharges take place per rotation of the cam shaft. In FIG. 2, the three possible positions during the pivot movement of the rocker arm (from starting position to starting position) are illustrated, of which the first position (valve closed) is designated by reference character $a$, the second position (valve half opened or center position of the rocker arm) by reference character $b$ and the third position (valve completely open) by reference character $c$.

Figure 3:
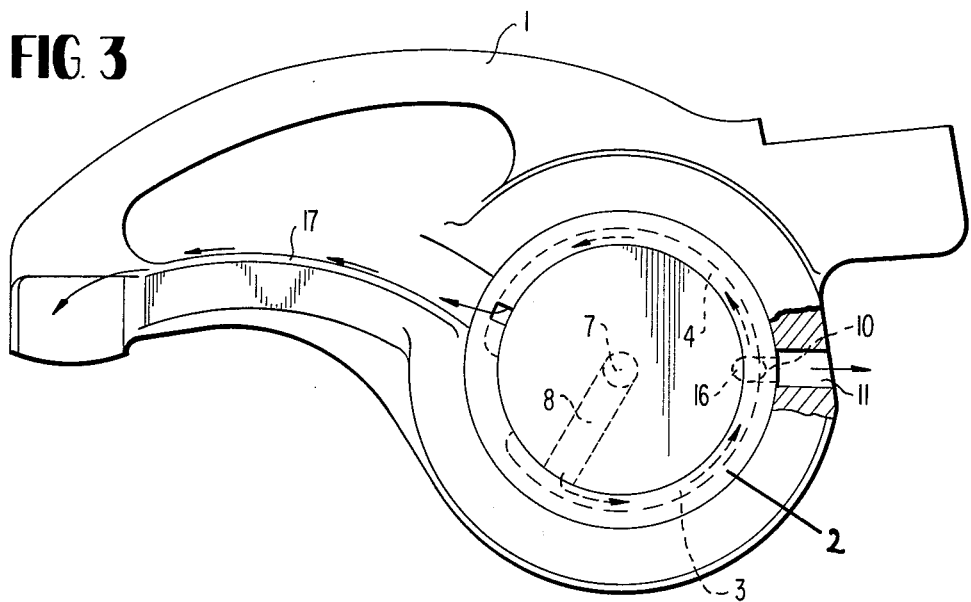
FIG. 3 is an elevational view, again partly in cross section, of a second embodiment of a lubricating installation according to the present invention.
Figure 4:
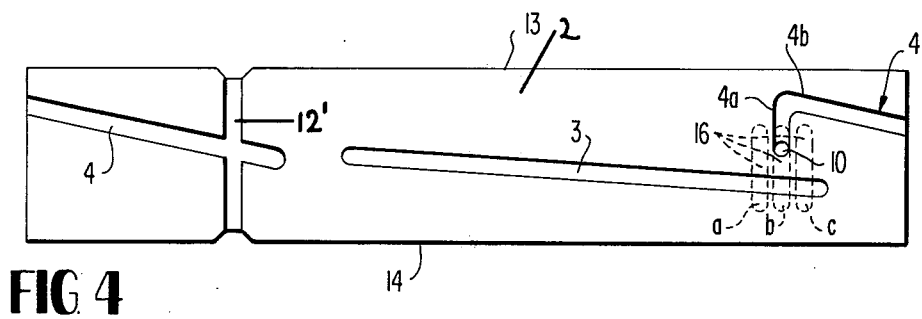
FIG. 4 is a development of the bearing shell or sleeve according to FIG. 3, in the plane of the drawing.

In a further embodiment of the present invention according to FIG. 3, the two oil grooves 3 and 4 which are machined into the inner surface of the bearing shell or sleeve 2, do not extend in the cross center plane of the bearing sleeve—as in the previously described arrangement—, but the first oil supply groove 3 extends, starting from the cross center plane, at an angle of about 5° with respect to the same—as can be clearly seen from FIG. 4—whereas the second oil supply groove 4 extends offset and approximately parallel to the first oil supply groove 3, whereby the oil supply groove 3 extends over an angular area of about 180° and the oil supply groove 4 over an angular area of about 170° (FIG. 3).

Shortly upstream of the termination of the oil supply groove 3—as viewed in the feed direction—the spray-off bore 10 extending through the bearing shell or sleeve 2 is arranged adjacent to this groove 3 and more particularly in the cross center plane of the bearing sleeve 2; the through-bore 11 of the rocker arm 1 is disposed in the continuation of the spray-off bore 10. An auxiliary section 4a of the oil supply bore 4, which adjoins this spray-off bore 10, passes over into the main section 4b; the auxiliary section 4a thereby extends parallel to the bearing axis.

The recess 16 provided in the bearing pin 5 of the bearing bracket or support 6 as control groove overlaps in the center position $b$ of the rocker arm 1 the oil supply groove 3, the oil supply bore 10 and a part of the auxiliary section 4a of the second oil supply groove 4. All three positions of the rocker arm 1 and the respective position of the control groove 16 to the bearing sleeve 2 are illustrated in dash lines and—corresponding to the first embodiment—are designated by the same reference numerals.

Approximately upstream of the end of the second oil supply groove—as viewed in the feed direction—a distributor groove 12' crosses this oil supply groove 4, which distributor groove 12' extends parallel to the bearing axis of the bearing sleeve 2 and terminates at both side surfaces 13 and 14 of this bearing shell or sleeve.

The lubricating oil spraying off also through the openings of the through-bore 11 and of the oil distributor groove 12' reaches in a similar manner as in the first embodiment, the corresponding lubricating places of the parts cooperating with the rocker arm.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An installation for the lubrication of a bearing which includes a bearing sleeve means with a first oil supply groove means extending in the circumferential direction and provided at the inner surface of the bearing sleeve means, a pin provided with a radial oil supply bore terminating in said oil supply groove means, characterized in that the bearing sleeve means is provided with a second oil supply groove means extending substantially in the same direction as the first-mentioned oil supply groove means and at a distance therefrom, the pin which is relatively fixedly arranged and on which the bearing sleeve means is rotatably supported, being provided with a recess means which, in the starting position of the bearing sleeve means, overlaps only one of the oil supply groove means and which, upon slight rotary movement of the bearing sleeve means, so connects the two oil supply groove means with each other that the previously interrupted oil flow is lifted and the lubricating oil which is under pressure is conducted to lubricating oil places by way of the second oil supply groove means.

2. An installation according to claim 1, characterized in that the bearing is for a rocker arm in motor vehicles.

3. An installation according to claim 2, in which the bearing sleeve means is securely connected with the rocker arm which is coordinated to a valve and is actuated from a cam shaft by way of a push rod, characterized in that a spray-off bore means which extends through the bearing sleeve means, branches off from the second oil supply groove means and in that a throughbore is provided in the rocker arm in continuation of the spray-off bore means, the through-bore terminating in proximity to the connecting place formed by the push rod and rocker arm, and in that the second oil supply groove means subdivides downstream of the spray-off bore means—as viewed in the feed direction—into oil distributor grooves which so terminate at the side surfaces of the bearing sleeve means that the discharged lubricating oil reaches the connecting place formed by the rocker arm and the valve stem by way of the forward area of the rocker arm.

4. An installation according to claim 3, characterized in that the two oil supply groove means extend in the cross center plane of the bearing sleeve means, of which both the first as also the second oil supply groove means extend each over a circumferential area of about 120°, and in that each oil distributor groove branching off from the second oil supply groove means extends from the cross center plane of the bearing sleeve means at an acute angle with respect thereto.

5. An installation according to claim 4, characterized in that the acute angle is about 45°.

6. An installation according to claim 5, characterized in that the recess means provided in the pin is constructed as dead-end bore.

7. An installation according to claim 3, characterized in that the first-mentioned oil supply groove means extends, starting from the cross center plane of the bearing sleeve means, at an acute angle with respect thereto and in that the second oil supply groove means which includes a short first section starting from the spray-off bore means and extending substantially parallel to the bearing axis, which passes over into a main section, extends with its main section—in relation to the first oil supply groove means—offset and at least approximately parallel thereto, and in that oil distributor grooves branching off from the second oil supply groove means extend approximately parallel to the bearing axis.

8. An installation according to claim 7, characterized in that the acute angle is about 5°.

9. An installation according to claim 8, characterized in that the main section extends parallel to the first oil supply groove means.

10. An installation according to claim 8, characterized in that the spray-off bore means is located adjacent the first oil supply groove means shortly upstream of the end thereof as viewed in the feed direction.

11. An installation according to claim 10, characterized in that the recess means disposed in the pin is constructed as control groove which extends substantially parallel to the bearing axis and has such a length that in case of overlap, the control groove extends from the first oil supply groove means by way of the spray-off bore means up to the first section of the second oil supply groove means.

12. An installation according to claim 1, characterized in that the two oil supply groove means extend in the cross center plane of the bearing sleeve means, of which both the first as also the second oil supply groove means extend each over a circumferential area of about 120°, and in that each oil distributor groove branching off from the second oil supply groove means extends from the cross center plane of the bearing sleeve means at an acute angle with respect thereto.

13. An installation according to claim 12, characterized in that the acute angle is about 45°.

14. An installation according to claim 1, characterized in that the recess means provided in the pin is constructed as dead-end bore.

15. An installation according to claim 1, characterized in that the first-mentioned oil supply groove means extends, starting from the cross center plane of the bearing sleeve means, at an acute angle with respect thereto and in that the second oil supply groove means which includes a short first section starting from the spray-off bore means and extending substantially parallel to the bearing axis, which passes over into a main section, extends with its main section—in relation to the first oil supply groove means—offset and at least approximately parallel thereto, and in that oil distributor grooves branching off from the second oil supply groove means extend approximately parallel to the bearing axis.

16. An installation according to claim 15, characterized in that the acute angle is about 5°.

17. An installation according to claim 15, characterized in that the main section extends parallel to the first oil supply groove means.

18. An installation according to claim 1, characterized in that the spray-off bore means is located adjacent the first oil supply groove means shortly upstream of the end thereof as viewed in the feed direction.

19. An installation according to claim 1, characterized in that the recess means disposed in the pin is constructed as control groove which extends substantially parallel to the bearing axis and has such a length that in case of overlap, the control groove extends from the first oil supply groove means by way of the spray-off bore means up to a first section of the second oil supply groove means.

* * * * *